June 30, 1959 — W. E. KRESSIN — 2,892,327
FLEXIBLE COUPLING
Filed Dec. 27, 1955

INVENTOR.
WILLIAM E. KRESSIN
BY
Attorneys

United States Patent Office 2,892,327
Patented June 30, 1959

2,892,327
FLEXIBLE COUPLING
William E. Kressin, Watertown, Wis.
Application December 27, 1955, Serial No. 555,442
5 Claims. (Cl. 64—14)

This invention relates to flexible couplings for connecting the adjacent ends of two shafts and particularly to the composition thereof which increases the length of service of the coupling and eliminates all interfering metal parts which may spark and ignite anything nearby which is combustible or inflammable.

According to the invention both the driving and driven parts of the coupling are of a rubber composition and construction so that their relative movement due to angular misalignment of the shafts is largely accommodated by the resilience of the composition. The frictional wear resulting from such relative movement is virtually unmeasurable by reason of the similarity of the composition of both parts and the resilience thereof.

The only metal parts employed comprise the hub-inserts which provide the securement of the driving and driven parts of the coupling with the respective shafts. The present invention further provides for the particular securement of the resilient parts with the respective metal inserts to resist the centrifugal forces involved in service.

The principal objects of the invention are to eliminate fire hazard and to increase the serviceability of the coupling.

A more particular object is to eliminate any contact of metal parts which might occur in the event of failure of the flexible parts of the hub.

A further object of the invention is to more firmly secure the rubber to the hub to resist radial as well as torque loads.

Another object is to provide for the flexibility of the coupling to accommodate any angular misalignment of the shaft but without in any way imposing an axial load on either shaft in either direction.

The drawings furnished herewith illustrate the best mode of carrying out the invention as presently contemplated and set forth hereinafter.

Figure 1:
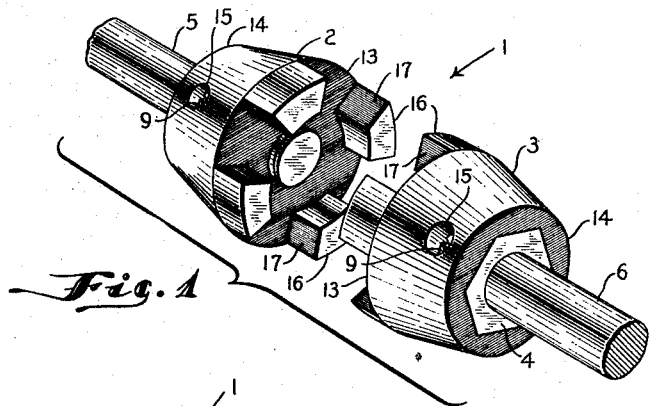
Figure 1 is a perspective view of the coupling for connecting two shafts with the shafts separated to show the corresponding parts of the coupling.
Figure 2:
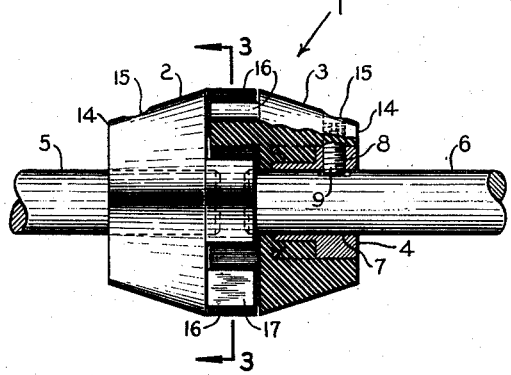
Fig. 2 is a side elevation of the coupling as mounted on the shafts disposed in normal relation and with one part of the coupling broken away and sectioned to show the construction thereof and of the hub insert.

The flexible coupling 1, shown in the drawings, includes the two separate parts 2 and 3 each of which includes a metal insert 4 which forms the hub therefor and whereby the parts are mounted respectively on adjacent ends of the axially aligned shafts 5 and 6.

Each hub insert 4 has an axial bore 7 extending therethrough for mounting on the particular shaft and is fitted with a threaded radial opening 8 which carries a set screw 9 for securing the hub insert on the shaft. The outer end of each hub insert 4 as mounted on the particular shaft is provided with an annular groove 10 which communicates with each of the several recesses 11 respectively formed in the several sides 12 of the insert.

Each part 2 and 3 is formed of a rubber composition which is molded over the particular hub insert 4 and is of generally tapered dimensions with the larger end 13 molded over the end face of the hub insert 4 provided with the groove 10 so that the material forming the part flows into the groove 10 to merge with the material in recesses 11 and provide a full interlocking of the coupling part with the respective insert 4. The smaller end 14 of the part is generally flush with the other plain end of the particular hub insert 4 and an opening 15 in each part is provided for reaching the set screw 9.

The coupling parts 2 and 3 are separately mounted on shafts 5 and 6, respectively, with the larger ends 13 of parts facing each other and the teeth 16 of each part in interengagement with the teeth of the other part. The clutch teeth 16 are integrally formed with the respective part and project axially from the end face of each part to interengage the corresponding teeth 16 of the other part to provide the desired torque transmission between shafts 5 and 6.

The interengaging faces 17 of teeth 16 are plane surfaces which intersect on the axis of rotation of the respective parts whereby their relative movement is unaffected by the torque load applied thereto particularly so that no axial thrust is transmitted from either shaft 5 or 6 to the other. The parts 2 and 3 are secured to the respective safts 5 and 6 with a predetermined clearance between the end face of one part and the teeth 16 of the other part to accommodate the maximum anticipated angular misalignment of the shafts so that no axial force is developed between the shafts by reason of such misalignment.

Figure 3:
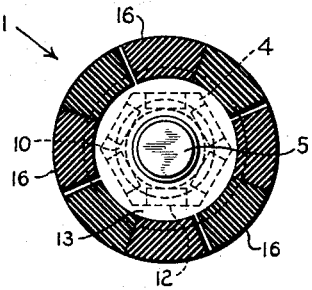
Fig. 3 is a section taken on line 3—3 of Fig. 2.
Figure 4:
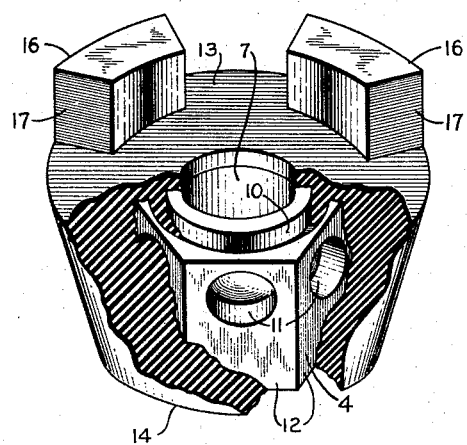
Fig. 4 is an enlarged perspective view of one part of the coupling with portions thereof broken away to show the hub insert thereof.

To provide maximum capacity the maximum number and size of teeth 16 must be employed and requires that each tooth of one part fits between the teeth of the other part. Figure 3 shows the teeth 16 of part 2 driving and in engagement with the teeth of part 3. The spaces shown between the teeth represent the clearance provided between the teeth for assembly purposes.

The desired capacity and size of coupling 1 determines the outer radical dimension of the teeth 16 and the axial dimension or height of each tooth 16 should be sufficient to assure the efficient loading of the engaging faces 17 of the teeth. The inner radial dimension is limited by the size of shafts 5 and 6 and more particularly by practical considerations and the fact that the portions of the teeth approaching the axis of rotation add negligibly to the torque capacity of the coupling.

Any number of teeth 16 employed which are symmetrically spaced allow parts 2 and 3 to be conveniently identical. The greater number of teeth provide the greater area of contact of faces 17 and reduce the unit loading thereof. However, the circumferential limitations imposed by the maximum size of the coupling and centrifugal forces involved at high rotational speeds limit the width of each tooth 16 between faces 17 and the root dimensions which determine the securement of each tooth with the end 13 of the respective part. Such root securement must be sufficient to support the tooth against breaking away from the end 13 so that a particularly limited number of teeth as the four teeth shown in the drawing will be found practicable depending also on the hardness and the tensile strength of the material employed.

According to the invention, both parts 2 and 3 of coupling 1 are formed of a composition such as uncured cord rubber which is resistant to wear and resistant or impervious to whatever adverse materials and fluid may be present in service and also having a moderate resilience which allows the teeth 16 to conform to the slight angularity caused by the angular misalignment of the shafts. By reason of the resilience of parts 2 and 3 and of teeth 16, the interengaging faces 17 of the teeth are maintained under substantially equal load and full engagement throughout each 360° of revolution of the shafts and so that no abrasive materials are allowed to reach the faces and abrasive wearing of the teeth is thereby reduced to a minimum.

The interlocking of the larger end 13 of each of parts 2 and 3 with the respective hub 4 as provided allows the operating speed of the coupling 1 to exceed 3,000 r.p.m. as is necessary in many applications. The securement of the end 13 in the groove prevents the teeth 16 from excessive radially outward deflection by centrifugal force and from breaking the bonding of each part with the sides 12 of hub 4. Each of the two hubs 4 shown having six sides 12 provide a greater area of bonding and capacity to transmit torque between the shaft and the part of the coupling mounted on the shaft.

The invention eliminates all metal parts which might be allowed interengagement in the absence of the flexible part of the coupling which is usually most subject to failure. The coupling 1 is intended to yield to overloading whereby other parts of the machinery are protected against damage. In such event either or both parts 2 and 3 may be stripped of teeth 16. However, no matter how long the coupling 1 continues to function or the driving part continues to rotate after failure of the coupling, there are no metal parts disposed to engagement and possible sparking which might ignite the dust in the atmosphere or anything inflammable such as oil on the parts from the shaft bearings.

The teeth 16 are firmly secured by the interlocking of each part of the coupling with the respective hub-insert and the root of each tooth 16 may be additionally reinforced by fillets, not shown, facing toward the center of the coupling and formed integrally with the teeth and the end of the respective part.

The coupling is intended for use in grain mills where such a fire hazard exists and where the coupling of the present invention has been found particularly advantageous.

Various modes of carrying out the invention are contemplated as within the scope of the following claims particularly pointing out and distinctly claiming the subject matter which is regarded as the invention.

I claim:

1. In a flexible coupling for connecting the end of one shaft with another which coupling comprises two separable complemental parts each having engaging end portions symmetrical each with respect to the other, said engaging end portions including angularly spaced, axially extending teeth to receive and engage therebetween the corresponding teeth of the other part, said parts being subject to relative movement by reason of any angular misalignment of the shafts and said teeth being subject to frictional interengagement in the transmission of power from one to the other shaft, said teeth having their leading and trailing edges disposed in corresponding axial planes with the leading edges of the teeth of the driving part engaging the trailing edges of the corresponding teeth of the driven part and the leading edges of the teeth of the driven part closely adjacent and normally engaging the trailing edges of the teeth of the driving part, and said coupling being characterized by the fact that both parts comprise a rubber composition having resilience for accommodating a degree of said relative movement and providing for a minimum of wear due to the frictional interengagement therebetween.

2. In a flexible coupling for connecting the end of a driven shaft to the end of a driving shaft rotatable in either direction, which coupling comprises two separable parts each having engaging end portions symmetrical each with respect to the other, said engaging end portions including angularly spaced, axially extending teeth to receive and engage therebetween the corresponding teeth of the other part, said parts being subject to relative movement by reason of any angular misalignment of the shafts, said teeth of each part having radial, plane leading and trailing surfaces for engagement with the corresponding surfaces of the other part and capable of transmitting torque in either direction of shaft rotation and said teeth being subject to frictional interengagement in the transmission of power from the driving to the driven shaft, said coupling being characterized by the fact that both parts comprise a rubber composition having a resilience which allows the torque load to be maintained so that said surfaces of the teeth are in constant and maximum interengagement regardless of angular misalignment.

3. In a flexible coupling for connecting the end of one shaft with another which coupling comprises two separable symmetrical molded parts each having spaced, axially extending teeth to receive therebetween and engage the corresponding teeth of the other part, said parts being flexible and subject to relative movement by reason of any angular misalignment of the shafts and said teeth being subject to frictional interengagement in the transmission of power from the driving to the driven shaft, a metallic hub-insert for securement of each part on and to the particular shaft, each of said inserts having a series of recesses opening radially outwardly thereof and an annular groove formed in one end thereof and communicating with said recesses, each part being molded over the respective insert and said one end thereof with the molded portion in said groove joined with the molded portions in said recesses to provide the positive interlocking of said part and said insert, said coupling being characterized by the fact that both parts comprise a rubber composition having resilience for accommodating a degree of said relative movement and providing for a minimum of wear due to frictional interengagement therebetween.

4. In a flexible coupling for connecting the end of one shaft with another which coupling comprises two separable symmetrical molded parts, a series of teeth axially extending from corresponding end of each part therebetween and engage the corresponding teeth of the other part, said parts being flexible and subject to relative movement by reason of any angular misalignment of the shafts and said teeth being subject to centrifugal force in the rotary transmission of power from the driving to the driven shaft, a metallic hub-insert for securement of each part on and to the particular shaft, each of said inserts having a series of recesses opening radially outwardly thereof and an annular groove formed in one end thereof and communicating with said recesses, each part being molded over the respective insert and said corresponding end of each part extending into said groove and joined with the molded portions of the part in said recesses to provide the positive interlocking of said part and said insert, and prevent centrifugal force from pulling said end of the part from the insert.

5. In a coupling element having a coupling face, a metallic hub-insert adapted for securement on a shaft, said insert having a series of recesses opening radially outwardly thereof and an annular groove formed in the end thereof adjacent to the coupling face and communicating with said recesses, and a resilient outer member of molded material disposed on said insert and extending over the end thereof and adapted to provide the coupling face, the molded material of said outer member extending through said recesses and joining with the material disposed in the groove to provide a positive interlock between the outer member and the hub-insert.

References Cited in the file of this patent
UNITED STATES PATENTS

| | | |
|---|---|---|
| 2,025,828 | Ricefield | Dec. 31, 1935 |
| 2,200,640 | Ricefield | May 14, 1940 |
| 2,482,007 | King | Sept. 13, 1949 |
| 2,755,900 | Seyfried | July 24, 1956 |